Patented Feb. 25, 1941

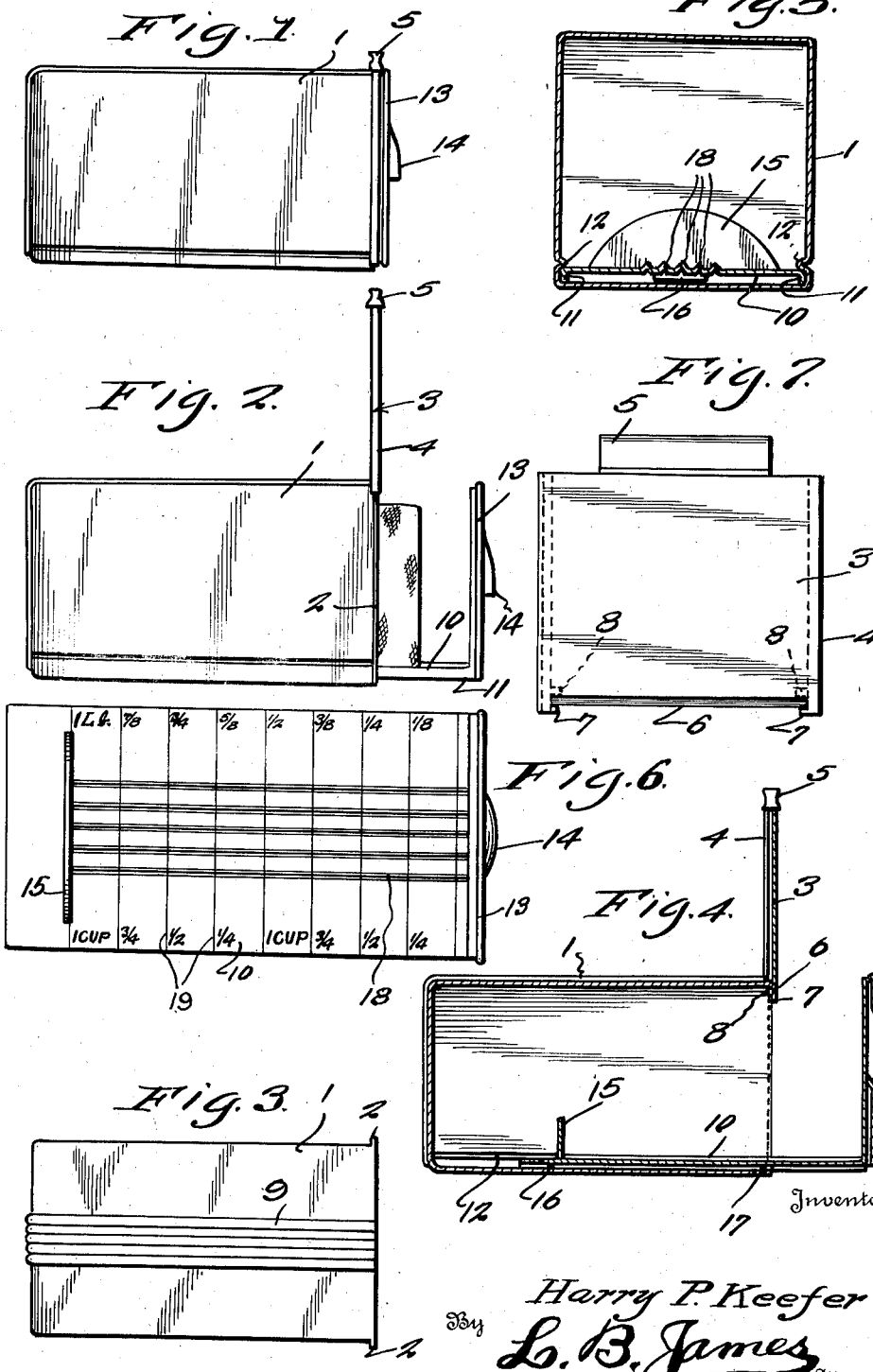

2,232,918

UNITED STATES PATENT OFFICE 2,232,918

BUTTER CONTAINER

Harry P. Keefer, Alliance, Ohio, assignor of one-half to E. G. Axelrod, Alliance, Ohio Application May 25, 1939, Serial No. 275,731

2 Claims. (Cl. 31—20)

This invention relates to a container for butter and the like, the general object of the invention being to provide means whereby the cake of butter can be cut into desired sized slices without removing the cake from the container.

The invention also consists in certain other features of construction, combination and arrangement of the several parts, to be hereinafter fully described, illustrated in the accompanying drawing and specifically pointed out in the appended claims.

In describing the invention in detail reference will be had to the accompanying drawing wherein like characters denote like or corresponding parts throughout the several views, and in which:

Figure 1 is a side view of the device.

Figure 2 is a similar view but showing the tray partly withdrawn and the knife in raised position ready to cut a slice from the cake.

Figure 3 is a top plan view of the case.

Figure 4 is a longitudinal sectional view through the device with the parts in position as shown in Figure 2.

Figure 5 is a transverse sectional view.

Figure 6 is a top plan view of the tray.

Figure 7 is a view of the knife member.

In these views, the numeral 1 indicates the case which is entirely closed except at its front end, where the case is formed with the exterior flanges 2 at the sides thereof, which form guides for the knife member 3. Said member 3 is formed with the turned over side portions 4 which form grooves receiving the flanges 2 so that the knife member can be moved vertically at the front of the case. The knife member is formed at its upper end with a handle 5 and a beveled lower edge 6. Small stops 7 extend downwardly from the ends of the beveled edge to prevent said edge from coming into contact with the tray, hereinafter described. The knife member is also formed with the stops 8 for engaging top parts of the case to prevent the knife member from being entirely pulled from the case. The top of the case is provided with the corrugations 9.

The tray is shown at 10 and has depending flanges 11 at its sides engaging the bottom of the case and the case is formed with the beads 12 under which the side edges of the tray slide. The tray is provided with an upstanding front part 13 provided with a handle 14, said part 13 closing the front of the case when the tray is pushed into the case. A small back member 15 extends upwardly from the rear part of the tray, a slight distance from the rear end thereof and a projection 16 depends from the rear of the tray to engage a projection 17 at the front part of the bottom of the case to prevent entire withdrawal of the tray from the case. The part 15 is so positioned that the tray can be drawn out of the case to an extent to remove all the butter from the tray without entirely removing the tray from the case. The bottom of the tray is formed with the corrugations 18 to prevent sidewise movement of a cake of butter placed on the tray and said tray is formed with the graduations 19 to facilitate the cutting of the cake in slices of exact widths, the graduations shown in Figure 6 being designed for the cutting of the cake into fractions of pounds and parts equal to cups and fractions thereof.

Thus it will be seen that after a cake or piece of butter or other material is placed on the tray, the tray can be pulled far enough from the case to bring the desired amount of the material out of the case. Then the knife is lowered to cut the desired amount of material from the cake and the part cut can be picked up off the front end of the tray in front of the knife.

It is thought from the foregoing description that the advantages and novel features of the invention will be readily apparent.

It is to be understood that changes may be made in the construction, combination and arrangement of the several parts, provided such changes fall within the scope of the appended claims.

What I claim and desire to protect by Letters Patent is:

1. A butter container comprising a casing open at its front end and having side walls formed with outstanding flanges along their front edges, lower portions of the side walls being bent inwardly to form longitudinally extending horizontal ribs spaced upwardly from the bottom of the casing, a tray slidable longitudinally in said casing and having its side edge portions engaging under said ribs and formed with depending flanges resting upon the bottom of the casing, a lip extending upwardly from the front end of the bottom of the casing between the flanges of the tray, a tongue extending downwardly from the rear end of said tray for engaging said lip and limiting outward movement of tray, a closure for the open front of said casing extending upwardly from the front end of said tray and having a handle protruding outwardly therefrom, a slicing plate disposed vertically at the front of said casing and having its side portions bent rearwardly and inwardly to form channels receiving the side flanges of the casing and slidably mounting the plate, the lower edge of said plate being sharpened to form a cutting edge, and depending stops at opposite ends of the sharpened lower edge of said plate for limiting downward movement of the plate and preventing dulling engagement of its sharpened edge with the tray.

2. A butter container comprising a casing open at its front end and having side walls formed with inwardly extending horizontal guides adjacent their lower edges, a tray slidable into and out of the casing through the open front end thereof with its side edge portions engaged under said guides to prevent vertical tilting of the tray when drawn outwardly, an upstanding member at the front end of said tray constituting a closure for the open front end of said casing when the tray is shifted into the casing, tracks extending vertically at opposite sides of the open front end of the casing, a slicing plate disposed vertically at the open front end of said casing slidably engaging said tracks and extending across the open front end of the casing, the lower edge of said plate being sharpened for cutting through butter upon the tray as the plate is shifted downwardly with the tray drawn outwardly a predetermined extent, and depending abutment lugs at opposite ends of the sharpened lower edge of the plate for limiting downward movement of the plate and preventing dulling engagement of the sharpened edge with the tray.

HARRY P. KEEFER.